(12) United States Patent
Tuomela et al.

(10) Patent No.: US 7,190,690 B2
(45) Date of Patent: Mar. 13, 2007

(54) INTERFERENCE REDUCTION

(75) Inventors: Teemu Tuomela, Kaarina (FI); Arto Palin, Viiala (FI)

(73) Assignee: Nokia Corporation, Espoo (FI)

( * ) Notice: Subject to any disclaimer, the term of this patent is extended or adjusted under 35 U.S.C. 154(b) by 1096 days.

(21) Appl. No.: 10/183,808

(22) Filed: Jun. 25, 2002

(65) Prior Publication Data
US 2003/0235179 A1    Dec. 25, 2003

(30) Foreign Application Priority Data
Jun. 25, 2001    (FI) .................................. 20011359

(51) Int. Cl.
*H04B 7/212*    (2006.01)

(52) U.S. Cl. ...................................... 370/347; 370/442

(58) Field of Classification Search ................ 370/347, 370/337, 321, 338, 331, 311, 329, 314, 442; 455/422.1, 450, 517, 449
See application file for complete search history.

(56) References Cited

U.S. PATENT DOCUMENTS 6,745,027 B2 * 6/2004 Twitchell, Jr. ........... 455/422.1
6,873,825 B2 * 3/2005 Pattabiraman ............. 455/41.2

* cited by examiner

*Primary Examiner*—Chi Pham
*Assistant Examiner*—Alexander O. Boakye
(74) *Attorney, Agent, or Firm*—Harrington & Smith, PC

(57) ABSTRACT

Bluetooth relay devices can be used for networking different Bluetooth devices. Such relay devices typically have many Bluetooth modules, each of which can communicate with a number of different Bluetooth devices and/or adjacent relay devices. In order to avoid transmitting by one Bluetooth module of a relay device whilst its another Bluetooth module receives, all the Bluetooth modules of the relay device are set as masters and one of them is given control over the others so as to enforce all the Bluetooth modules to time their receptions so that no simultaneous transmissions by another Bluetooth modules occur.

18 Claims, 6 Drawing Sheets

INTERFERENCE REDUCTION

FIELD OF THE INVENTION

This invention relates to interference reduction, particularly to interference reduction in Low-Power Radio Frequency (LPRF) communication.

BACKGROUND OF THE INVENTION

The availability of various types of electronic devices produces a need to have these devices communicate with each other in a manner which is cost efficient and which can be easily implemented. Such communication can occur between two or more user's communication devices (for example, telephones, computers, printers, facsimile machines and personal digital assistants), either by wired connection using electrical conductors, or by wireless communication using infrared signals or LPRF signals. For many applications, LPRF signals are preferred, as they do not require line-of-sight between two devices being connected. LPRF communication devices have an LPRF module providing LPRF functionality. They transmit very weak radio signals compared to radio signals sent by cellular telephones such as GSM telephones. Thus, the LPRF communication devices are energy efficient and they have a short range and a high radio capacity.

Recently, LPRF systems have been proposed for providing communications between a plurality of transceivers through a short-range link having a coverage range of several meters. "Bluetooth" is one such LPRF systems. This system is designed to operate in an open (non-reserved) radio spectrum band around 2.4 gigahertz using Frequency Hopping Spread Spectrum (FHSS) system, with 79 channels each having a 1 MHz bandwidth. Bluetooth is targeted for communication devices which are located within an operable range of the LPRF system to communicate with each other.

In LPRF systems, particularly in Bluetooth systems, each of the two ends of an LPRF link (LPRF modules) assumes either one of two different states: master and slave. One end is always a master and the other end is a slave. These states are interchangeable so that the end that earlier was a slave can, on its request, become a master, whereas the earlier master becomes a slave.

In order to communicate over an LPRF link successfully, the two ends of the LPRF link, or two LPRF modules, must time their transmissions appropriately so that they each transmit only when the other one listens. This timing is controlled by the master, which synchronises the link. The link synchronisation refers to the fact that a frequency hopping scheme is defined by the address of the master and the timing by the master's clock. A data net of one master and one or more slaves is called a piconet. Data is exchanged in the piconet using Time Division Duplexing (TDD), in which there are predetermined master-to-slave and slave-to-master slots. Each of the slots has a duration of 625 μs. At simplest, single-slot communication mode is used, wherein each data packet takes 1 time slot. Additionally, two different multiple slot packet transmission modes are supported, where a packet occupies either 3 or 5 slots. With single-slot packets, the frequency is changed after each slot (after each packet) and in multiple slots packets after each multi-slot packet. In Bluetooth, two major types of data transmission links are used: Synchronous Connection-Oriented (SCO) links and Asynchronous Connection-Less (ACL) links. These have various sub-types, and in some (but not all) of them a receipt is provided after each burst, immediately following transmission of data for which the receipt is issued.

Bluetooth provides no centralised co-ordination of frequencies or timing of the transmissions between piconets. Thus, in the presence of multiple piconets, some collisions occur. These collisions are part of the normal operation of Bluetooth, but they are tolerable because there are up to 79 frequency channels and each of the piconets has its own frequency hopping scheme. The collisions are, therefore, rare enough. With ACL-links, retransmissions can also be used when collisions have happen, so that a collision does not cause severe problems.

Wireless relay networks also exist which, in effect, extend an operating range of a local RF system by using specific LPRF communication devices referred to as relay devices to interface with and provide communication between two or more user's communication devices. WO 98/17032 discloses a system in which many relay devices are wirelessly connected to each other to form an LPRF network. Each relay device has at least one, typically two LPRF modules in order to connect with at least one or two neighbouring relay devices, respectively.

In Bluetooth, each LPRF module (master) can serve up to seven active slaves. It is also possible for an LPRF communication device, particularly for a relay device, to have more than two LPRF modules. Thus, various types of links can be simultaneously in use by the same LPRF communication device. This increases the capacity of the LPRF system allowing a larger number of LPRF communication devices to simultaneously use the LPRF system. As mentioned in the foregoing, the link synchronisation is determined by the master. In other words, transmission time is decided for the slave modules by an LPRF communication module which is part of the relay device. As result, a number of LPRF modules of a single LPRF communication device may transmit and receive at different times. This interferes the receiving LPRF modules of said single LPRF communication device. The LPRF communication device can still operate, although with a reduced capacity, since most of transmissions interfering the receiving LPRF modules occur on frequency channels which differ from those listened by the receiving modules.

It is worth noting that in Bluetooth, unlike in GSM, for example, there are no different uplink and downlink frequency areas separated by a separation band. Instead, each of the frequency bands can be used in either direction. This enhances radio resource usage, but also makes it impossible to separate transmission branch of an LPRF module from a reception branch of the same LPRF module and explains why one LPRF module can either transmit or receive but not do the both on the same time. Additionally, different intermodulation product signals may occur and interfere the receiver branch. A transmission of one LPRF module may thus block a reception by another LPRF module even though the frequencies of the transmission and reception would differ. The LPRF modules must be made so that they can endure rather strong connection to their receiving branches from neighbouring LPRF modules' transmitter branches.

SUMMARY OF THE INVENTION

According to a first aspect of the invention there is provided a communication device comprising:
  a first Low Power Radio Frequency (LPRF) module for transmitting first data in bursts over a first LPRF link; and a second LPRF module for transmitting second data in bursts over a second LPRF link;

characterised in that the communication device further comprises a processing unit for choosing a one of the first and second data and leaving the other data non-chosen; and the processing unit is configured to:

determine a time window corresponding to the period of transmitting one burst of the chosen data; and restrict the transmitting of one burst of the non-chosen data to said time window, for timing the transmitting of two bursts within the same time window.

The communication device allows efficient interference reduction by forcing two different transmissions from the communication device to occur within the same time window. This results in possible receipts to bursts of first and second data being received in a controlled time so that the reception of the receipts is less interfered by the transmissions of the communication device itself.

Preferably, the processing unit is further configured to time the transmitting of non-chosen data so that both transmitting of one burst of the first and second data ends substantially simultaneously.

The ending of the transmissions substantially simultaneously results in capability of receiving in substantially simultaneously two transmissions, at least mostly and preferably totally on a time other than transmitting of either first or second data from the communication device. This further allows receiving data over a third LPRF link whilst neither the first nor second LPRF link is used for transmitting said first or second data.

Preferably, the processing unit is further configured to:
assign a first Quality of Service (QoS) group for the first data;
assign a second QoS group for the second data; and
choose the one of the first and second data based on the QoS group of the first and second data.

Preferably, each QoS group is mapped with a predetermined priority so that different QoS groups have different priorities and said choosing the one of the first and second data is performed by choosing the one which has a higher priority.

The choosing the time window based on the QoS allows the communication device to provide the most important services, because the transmitting of data with a lower priority is limited within the transmitting time of the data with a higher priority.

Preferably, the processing unit is configured to repeatedly determine said chosen data and said time window according to the one of first and second data which has a higher priority so that changes in priorities of the first and second data can be taken into account.

Preferably, the communication device further comprises at least one additional LPRF module for transmitting at least one additional data in bursts over at least one additional LPRF link.

Preferably, the processing unit is further configured to:
assign at least one additional QoS group for the at least one additional data; and
choose the one of the first, second and at least one additional data which has a highest priority.

Preferably, said communication device is selected from a group consisting of: a mobile communication device and an LPRF relay device.

Preferably, the processing unit is further configured to allow only one LPRF module at a time to transmit in one channel. Preferably, the LPRF module allowed to transmit is chosen on basis of priority. Alternatively, the LPRF module allowed to transmit is randomly or rotationally chosen.

Preferably, the time window corresponding to the period of transmitting of one burst of the chosen data is the period (moment of time and duration) of transmitting one burst of the chosen data.

Preferably, the communication device further comprises at least one clock for timing the first and second LPRF modules to frequency hopping on different radio channels according to predetermined schemes.

Preferably, if two LPRF modules would transmit in the same channel and at the same time, another of them is set to cancel the transmission.

Preferably, said first and second LPRF links are Bluetooth links.

Preferably, said first and second LPRF modules comprise radio transceivers.

Preferably, the processing unit is further configured to:
determine an intermediate period of time between two consecutive ones of said time windows; and
restricting the first and second LPRF modules to receive radio transmitted data from at least one external client within said intermediate period of time.

Preferably, the first LPRF module is configured capable of communicating with at least two different external clients using time division multiple access.

Preferably, the second LPRF module is configured capable of communicating with at least two different external clients using time division multiple access.

Preferably, the at least one additional LPRF module is configured capable of communicating with at least two different external clients using time division multiple access.

Preferably, the one burst of the chosen data corresponds to one data packet.

According to a second aspect of the invention there is provided a communication method comprising the steps of:
transmitting first data in bursts from a communication device over a first low-power radio frequency (LPRF) link; and
transmitting second data in bursts from the communication device over a second LPRF link;
characterised in that
the method further comprises the steps of:
choosing one of the first and second data and leaving the other data non-chosen;
determining a time window corresponding to the period of transmitting one burst of the chosen data; and
restricting the transmitting of one burst of the non-chosen data to said time window.

The method allows efficient interference reduction by forcing two different transmissions from the communication device within the same time window. This results in possible receipts to bursts of first and second data being received in a controlled time so that their reception is less interfered by the transmissions of the communication device itself.

Preferably, the method further comprises the step of timing the transmitting of non-chosen data so that both transmitting of one burst of the first and second data ends substantially simultaneously.

Preferably, the method further comprises the steps of:
performing said transmitting first data by a first LPRF module;
performing said transmitting second data by a second LPRF module;
assigning a first Quality of Service (QoS) group for the first data;

assigning a second QoS group for the second data; and
choosing the one of the first and second data based on the QoS group of the first and second data.

Preferably, each of the LPRF modules has at least one assigned QoS group, and said first and second data are assigned to LPRF modules having QoS groups to which the data belong.

Preferably, each QoS group is mapped with a predetermined priority so that different QoS groups have different priorities and said choosing the one of the first and second data is performed by choosing the one which has a higher priority.

The determining said time window based on the QoS group of the first and second data allows the communication device to provide the highest possible priority, because the transmitting of data with a lower priority is limited within the transmitting time of the data with a higher priority.

Preferably, the determining said time window according to the one of first and second data which has a higher priority takes place repeatedly so that changes in priority of the first and second data can be taken into account.

Preferably, the method further comprises transmitting of at least one additional data in bursts from a communication device over at least one additional LPRF link.

Preferably, the method further comprises the steps of:
performing said transmitting the at least one additional data by at least one additional LPRF module;
assigning at least one additional QoS group for the at least one additional data; and
determining said time window according to the one of the first, second and at least one additional data based on the QoS group of the first, second and at least one additional data.

Preferably, said communication device is selected from a group consisting of: a mobile communication device and an LPRF relay device.

Preferably, said first and second LPRF links are Bluetooth links.

Preferably, the method further comprises the steps of:
transmitting data by at least one external client to the communication device;
determining an intermediate period of time between two consecutive ones of said time windows; and
restricting the transmitting data by the at least one external client to said intermediate period of time.

According to a third aspect of the invention there is provided a communication system having a first, second and third communication device, said second and third communication devices each comprising Low Power Radio Frequency (LPRF) modules for communicating with the first communication device and the first communication device comprising:
a first Low Power Radio Frequency (LPRF) module for transmitting first data in bursts over a first LPRF link to the second communication device; and
a second LPRF module for transmitting second data in bursts over a second LPRF link to the third communication device;
characterised in that
the communication device further comprises a processing unit for choosing one of the first and second data and leaving the other data non-chosen; and
the processing unit is configured to:
determine a time window corresponding to the period of transmitting one burst of the chosen data; and
restrict the transmitting of one burst of the non-chosen data to said time window.

The first and second LPRF modules transmit within a same time window, which may totally prevent transmission by one of the first and second LPRF module whilst the remaining one of the first and second LPRF module attempts receiving data. Consequentially, the first communication device can be constructed using cheaper and simpler first and second LPRF modules.

Preferably, said first communication device is an LPRF relay device.

Preferably, at least one of the second and third communication devices is a mobile communication device.

According to a fourth aspect of the present invention there is provided a computer program for controlling a communication device, comprising:
computer program code for causing the communication device to transmit first data in bursts from a communication device over a first low-power radio frequency (LPRF) link; and
computer program code for causing the communication device to transmit second data in bursts from a communication device over a second LPRF link;
characterised in that
the computer program further comprises:
computer program code for causing the communication device to choose one of the first and second data and leaving the other data non-chosen;
computer program code for causing the communication device to determine a time window corresponding to the period of transmitting one burst of the chosen data; and
computer program code for causing the communication device to restrict the transmitting of one burst of the non-chosen data to said time window.

The embodiments of one aspect also apply to various other aspects of the invention. In sake of brevity, all the embodiments have not been repeated in connection with every aspect of the invention. A skilled reader will appreciate the advantages of the various aspects and embodiments based on the advantages of the first aspect and its embodiments.

BRIEF DESCRIPTION OF THE DRAWINGS

The invention will now be described, by way of example only, with reference to the accompanying drawings, in which.

DETAILED DESCRIPTION

Figure 1:
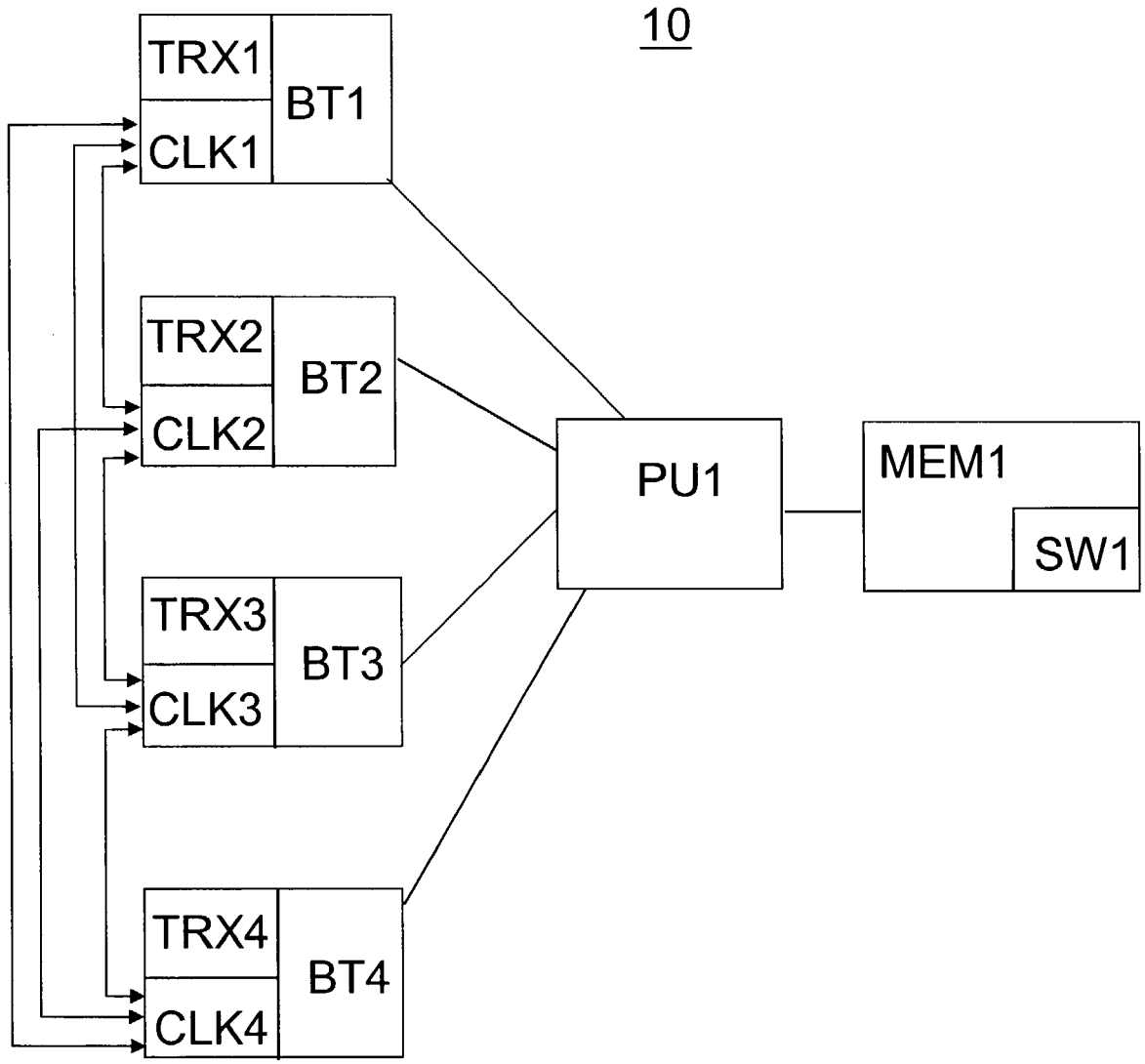
FIG. 1 shows a block diagram of a Bluetooth relay device according to a preferred embodiment of the invention.

FIG. 1 shows a block diagram of a Bluetooth relay device 10 according to a preferred embodiment of the invention. The relay device comprises a processing unit PU1 (e.g. a microprocessor, a master processing unit or Digital Signal Processor), which controls the operation of the device in accordance with software SW1 stored in a memory MEM1. The device further has a number of Bluetooth modules BT1 . . . BT4, having a transceiver circuitry (TRX1 . . . TRX4) and a clock (CLK1 . . . CLK4) for timing the operation of the transceiver circuitry. In Bluetooth, the operation of a slave is synchronised to conform with the clock of a master so that they can co-operate. Here, this operability is utilised in allowing any one of the BT1 . . . BT4 to control the clocking of the remaining ones of the BT1 . . . BT4.

PU1 controls the Bluetooth modules as will be explained in the following.

Figure 2:
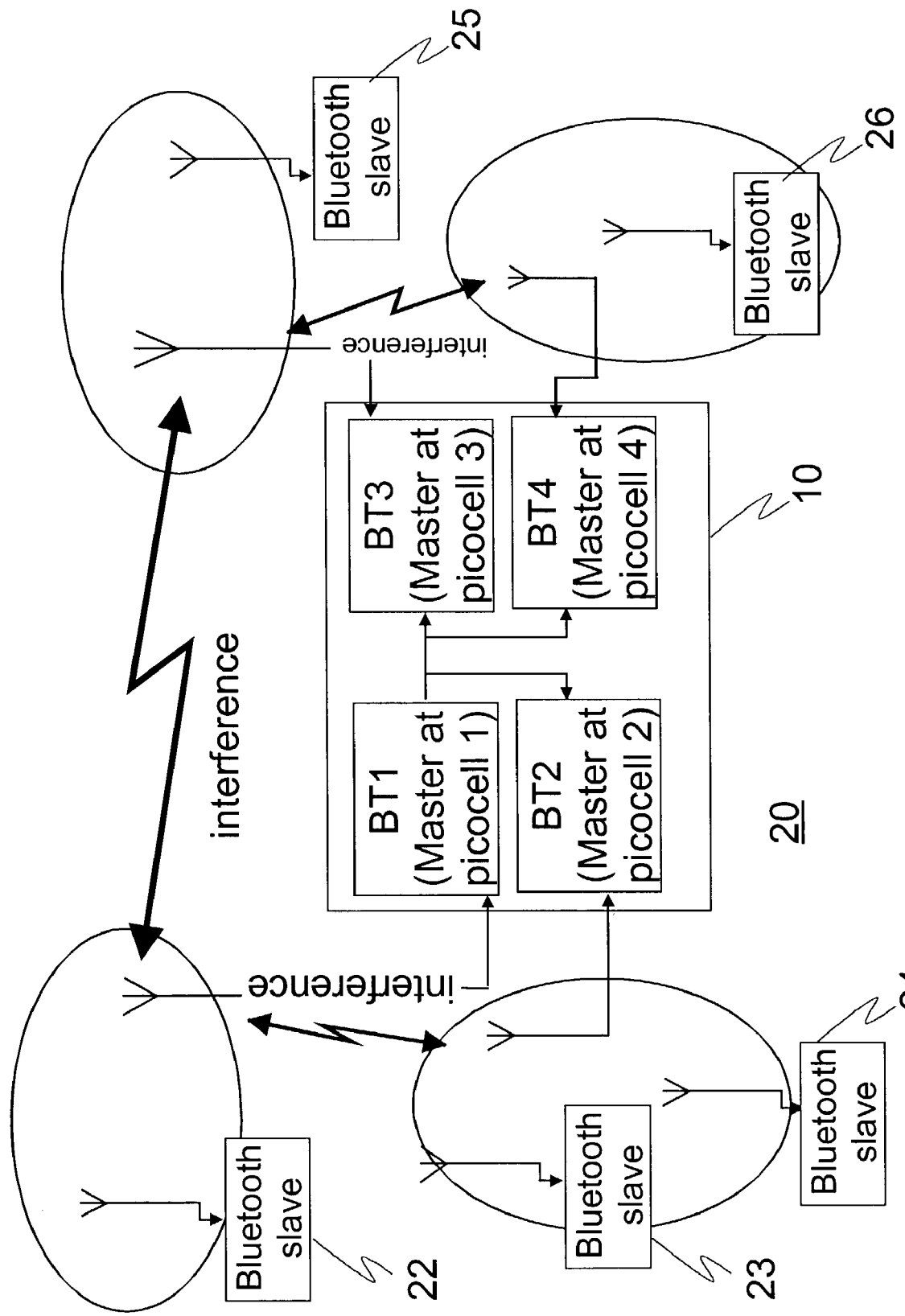
FIG. 2 shows a schematic diagram of the operation of the Bluetooth relay device of FIG. 1.

FIG. 2 shows a schematic diagram of the operation of the Bluetooth relay device 10 of FIG. 1 by reference to an exemplary communication system 20. In the communication system 20, five slaves 22 to 26 are within the coverage range of the Bluetooth relay device 10. They each have a connection with one of the Bluetooth modules BT1 to BT4. BT1 has been defined as a principal master Bluetooth module and it controls the transmission times of all the other Bluetooth modules so that one Bluetooth module does not receive data whilst another Bluetooth module of the same Bluetooth relay device is transmitting. In order to allow the principal master to control the transmission times of all the other Bluetooth modules, these other Bluetooth modules are configured to assume themselves the role of a master, not of a slave.

Typically, the reception of data is determined at each of the Bluetooth modules (For example, BT4) so that no concurrent transmission occurs by any other Bluetooth module (for example, BT1–BT3). The procedure for defining the principal master Bluetooth module according to an embodiment of the invention is described in the following with reference to FIG. 4.

In an alternative embodiment of the invention, one or more of the Bluetooth modules may be allowed to operate as slave. In this case, however, the timing of the transmission of such module(s) cannot be controlled by the principal master and thus reception may occur by one module simultaneously with transmission by another module. Hence, a reduction in interference is achieved, but some connection between a transmitter branch and a receiver branch may occur within the relay device.

Figure 3:
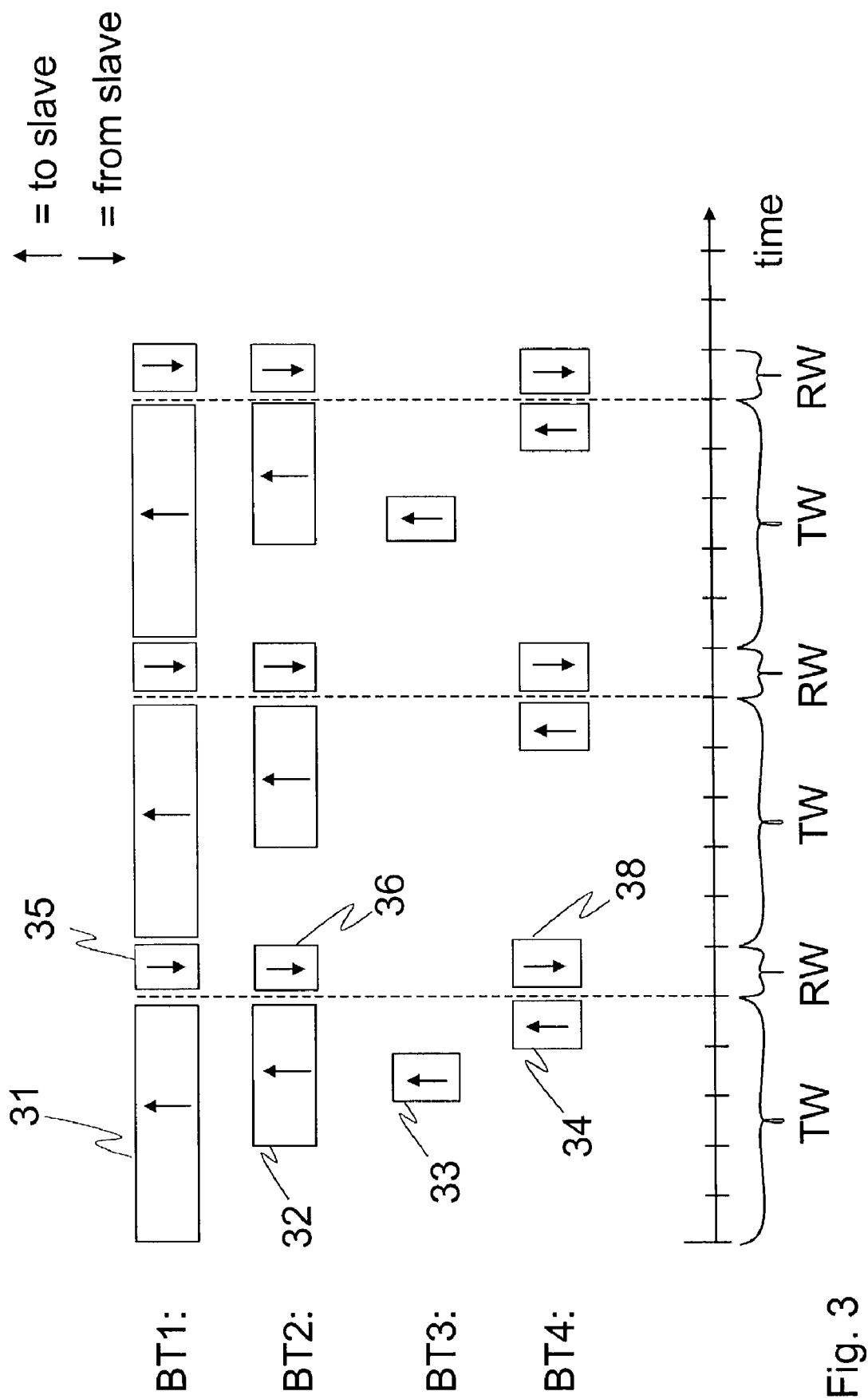
FIG. 3 shows a timing chart of transmissions from the Bluetooth relay device of FIG. 1.

FIG. 3 shows a timing chart of multi-slot transmissions from the Bluetooth relay device of FIG. 1. This timing chart closely relates to the process shown in FIG. 6. The timing chart represents the case wherein BT1 happens to be the principal master and it sends five-slot long packets in bursts occupying five time slots. In Bluetooth, the reception from slave typically follows in the immediately following slot after a transmission. Each of the modules BT1 to BT4 sends packets, referred to as 31 to 34, correspondingly. Immediately after sending of each of the packets 31, 32 and 34, correspondingly packets 35, 36 and 38 are received from the slave. Each of the packets 32 to 34 is timed to be sent during the sending of the packet by the principal master that is during the sending of the packet 31 (or transmission time window TW).

The transmission time window is a period of time during which the packet 31 is sent. Typically, the window matches with this period with the accuracy of a time period taken for transmitting one bit of data of the packet 31.

In an alternative embodiment of the invention, this transmission time window is slightly different so that it differs from the time of the transmission of the packet 31 by the duration of one or more bits. Such a difference may cause redundant harm, for example, if it only affects some leading bits (e.g. the preamble) without risking actual header or payload data contained by a packet.

The packet 33 is of a type such (for example, broadcast or null) that no reception is expected responsively. Therefore, the packet 33 may be sent in any of the five transmission slots, provided it is entirely sent during the sending of the packet 31 (or within the transmission time window TW).

The sending of the packet 33 need not necessarily end at the same slot as the packet 31, because it is not followed by a received packet. Instead, the packets 32 and 34 are immediately followed by received packets 36 and 38. In order to force the slaves send these packets so that they are received at a right time, in a reception time window RW, the packets 32 and 34 always end in the same slot as the packet 31. In FIG. 3, the reception time window RW is one time slot long.

The timing of the packets allows coordinated reception of packets within the reception time window RW, or while none of the Bluetooth relay device's modules BT1 to BT4 is transmitting. Therefore, the receiver side of these modules can be simplified, as they will not need to tolerate radio transmission by another module in the very same relay device. Furthermore, the error rate will be reduced. This is particularly advantageous in high traffic situations, where occurrence of errors leads to increase of traffic thus causing more collisions, which easily leads to network congestion.

The synchronisation of transmission slots has been explained with a five-slot long maximum transmitting time window example. It should be understood that correspondingly the invention can be applied so that multiple slots are reserved for receiving data after the transmissions. In this case, the transmission of data is prevented during all the receiving slots (reception time window RW) and the slaves may transmit data to the relay device in any of the receiving slots (preferably so that the reception ends right before next transmission time window TW). The masters, i.e. Bluetooth relay device's module's BT1 to BT4 are not allowed to transmit during the reception time windows RW. The determination of the reception time windows RW typically follows similar QoS considerations as the transmission of data that will be described in the following.

The procedure of deciding the principal master is next illustrated. As a skilled reader understands, based on the foregoing, the transmissions of all the other Bluetooth modules are restricted to those slots that are used by the principal master. Furthermore, the different Bluetooth modules are each synchronised so that they each start a time slot at practically the same time moment, that is, substantially simultaneously. Even further, the reception by each Bluetooth module is arranged to occur at the time when the principal master (as any other module) does not transmit. It follows that the length of the packets of the principal master determine the transmission time window TW that is the maximum length of all the packets sent by any of the Bluetooth modules.

According to an embodiment of the invention, different QoS groups are mapped with different priorities for the purpose of choosing the most suitable principal master. This mapping can be performed, for example, by primarily preferring high data rate and secondarily preferring fast connections (low round-trip delay) over slower ones, or vice versa. The selection of the principal master is performed by the PU1. Following is a table showing the mapping of QoS groups with different priorities for choosing the principal master according to two different embodiments of the invention.

TABLE I

The mapping of QoS groups with different priorities for choosing the principal master according to two different embodiments of the invention.

| QoS group | Principal master selection priority: | |
|---|---|---|
| | Version 1 (high data rate) | Version 2 (low delay) |
| 1) Low delay and medium high data rate (video) | 2 | 2 |
| 2) Low delay (voice) | 3 | 1 |
| 3) Guaranteed data rate | 1 | 3 |
| 4) Best effort | 4 | 4 |

Each of the Bluetooth modules may have numerous Bluetooth links in operation. The priority for each module is defined in accordance with the link that is used for the highest priority transmission.

A preferred embodiment takes a simpler approach, in which BT1 is always the principal master and the other Bluetooth modules BT2 to BT4 have a fixed order of priority, but the processing unit PU1 assigns the different transmissions to appropriate modules based on the QoS groups so as to define the time windows (TW,RW) used for transmission and reception of data. This embodiment greatly simplifies the construction of the relay device 10, as single clock control paths are needed. This approach is particularly useful when all the Bluetooth modules have a 360 degree radio field, that is, when no directional antennas are used.

The relay device 10 looks for the Bluetooth module that has the highest priority (smallest number in table 1). If more than one Bluetooth module has the same QoS group and thus the same priority number, a secondary criterion needs to be applied. For example, let us assume that BT1 has a highest priority transmission going on in QoS group 2 and BT2 in the same QoS group 2, and BT3 and BT4 have corresponding transmissions in QoS groups 3 and 4, respectively. On the other hand, if there are two or more Bluetooth modules each having identical priorities and identical slot requirements, then any one of them can be chosen as the principal master as the transmissions of the others need not be timed differently. It is, however, preferred that the principal master be randomly or rotationally selected in order to provide all the Bluetooth modules similar chances of being selected as the principal master.

Note that the transmissions of different Bluetooth modules typically vary in time and their mutual order in the priority may change. After any changes in priorities, the selection of the principal master will be updated, that is performed again.

Figure 4:
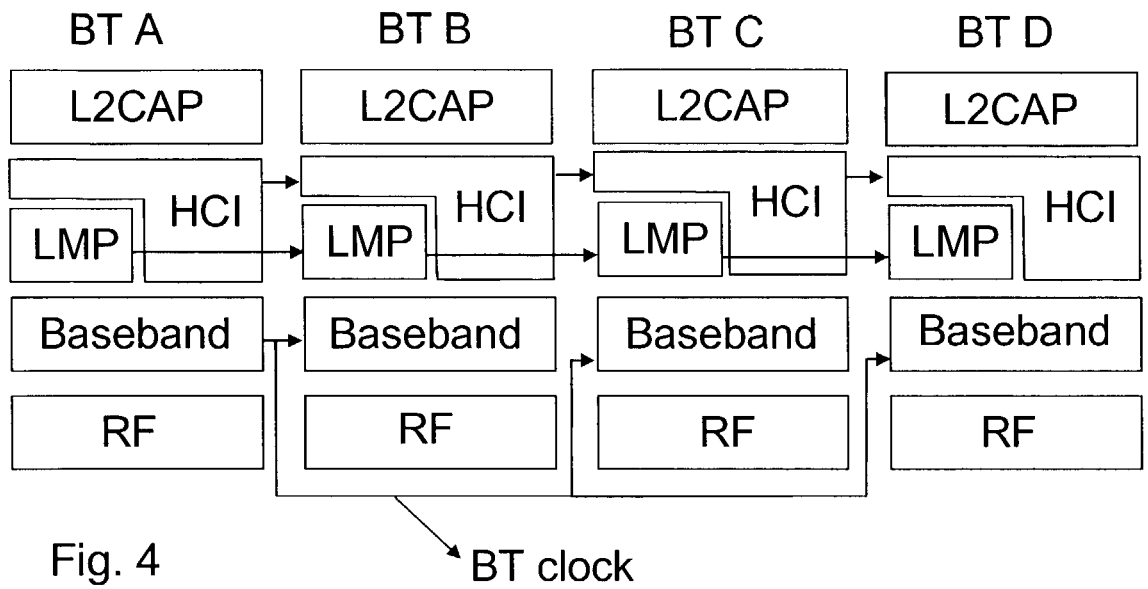
FIG. 4 shows a schematic diagram of Quality of Service (QoS) scheduling of the Bluetooth relay device of FIG. 1.

FIG. 4 shows a schematic diagram of the interoperation of different protocol layers of the Bluetooth relay device of FIG. 1 when the Quality of Service (QoS) scheduling is used. In FIG. 4, the Bluetooth modules BT1 . . . BT4 are arranged in a sequence, in a order of their priorities so that the principal master is the first and referred to as BTA, whilst the following Bluetooth modules are referred to as BTB, BTC and BTD. Each of the BTA . . . BTD has layers L2CAP, HCI, LMP, Base band and RF. In case of the preferred embodiment, wherein BT1 is constantly assigned to the highest priority QoS group, BT1 equals to BTA, BT2 equals to BTB and so forth.

Figure 5:
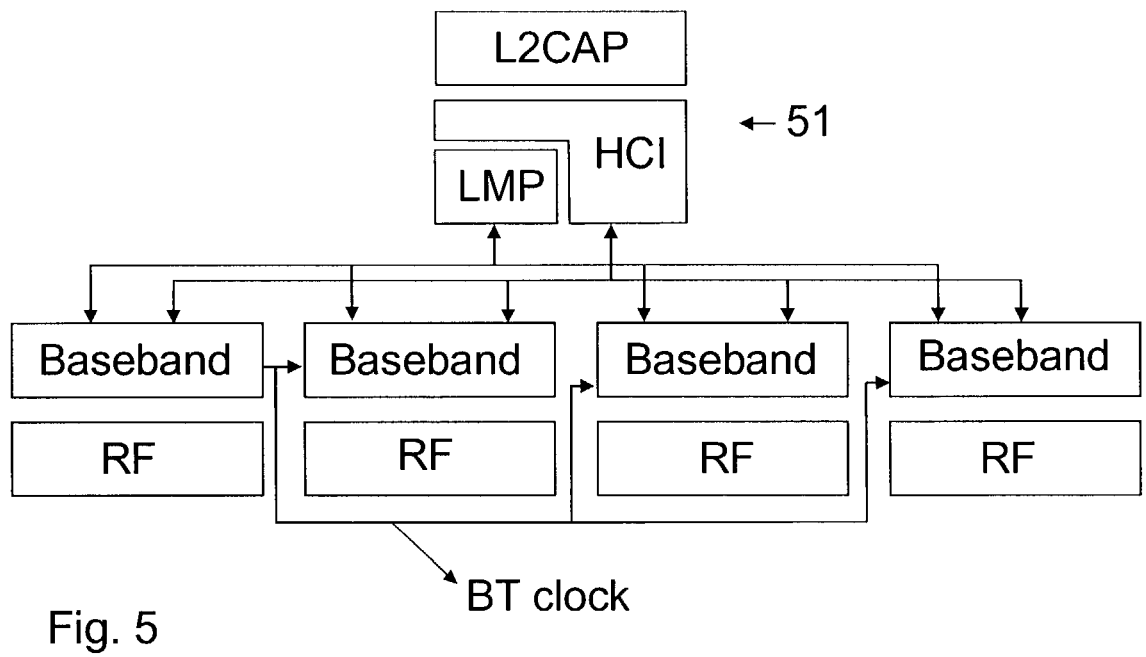
FIG. 5 shows a schematic diagram of Quality of Service (QoS) scheduling of the Bluetooth relay device according to an alternative embodiment of the invention.

As shown in FIG. 1, all the modules have clock signalling paths allowing different variations for the clocks of the Bluetooth modules to be connected. In FIG. 4, the principal master (referred to as BTA) is connected with the other Bluetooth modules (BTB, BTC and BTD). The base band layer of the principal master thus controls the base band layers of all the Bluetooth modules. Similarly, the LMP and HCI (Host Controller Interface) layers of BTA control the corresponding layers of BTB, BTC and BTD. The Bluetooth modules BTA . . . BTD further have an L2CAP layer (Logical Link Control and Adaptation Protocol). These layers and their use are well known from the art, for example from the Bluetooth, and thus they are not further described. In FIG. 5, each Bluetooth module has separately all the aforementioned layers, which allows easy construction of the system by using basic Bluetooth chips providing these layers. An alternative where a single protocol stack controls numerous Bluetooth modules is next described.

FIG. 5 shows a schematic diagram of the interoperation of different application layers of the Bluetooth relay device 10 of FIG. 1 when the Quality of Service (QoS) scheduling is used, according to an alternative embodiment. A single protocol stack 51 contains the layers L2CAP, HCI and LMP and controls the operation of a plurality of Bluetooth modules. Here it controls all the Bluetooth modules, but in yet another alternative (hybrid) embodiment there are two or more shared Bluetooth protocol stacks connected together and each controlling at least two different Bluetooth modules. These shared stacks are connected together so that the one of them can provide the timing to the other shared stack or stacks in order to synchronise the data communications of Bluetooth modules.

The advantage of a single Bluetooth protocol stack controlling all the Bluetooth modules is simple control of timing and transmissions for each of thus grouped Bluetooth modules. Further reduction of circuitry may be possible since the layer logic can be gathered into one single unit instead of sharing it amongst various Bluetooth modules of the relay device 10.

Figure 6:
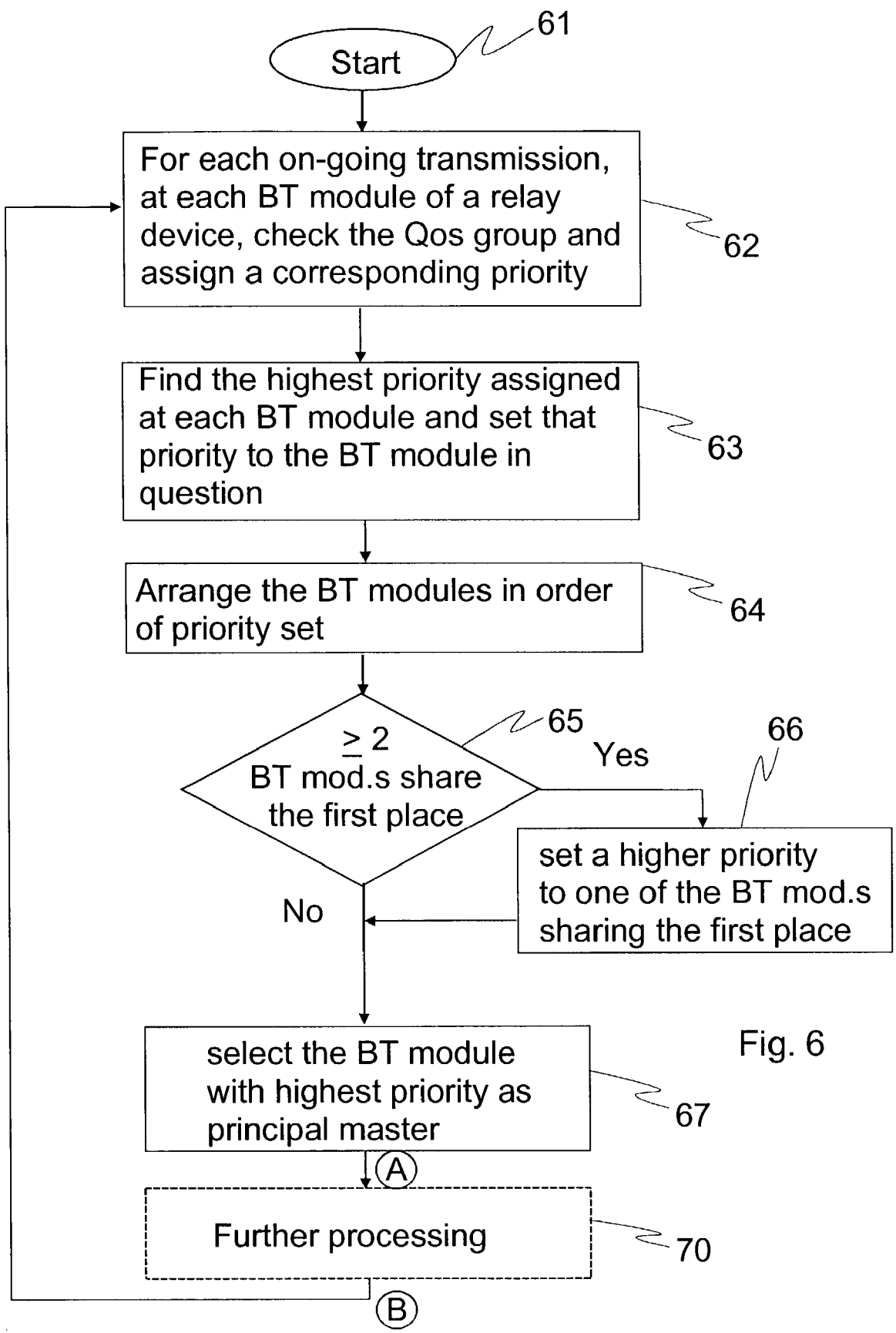
FIG. 6 shows a flow chart illustrating the operation of the Bluetooth relay device of FIG. 1.

FIG. 6 shows a flow chart illustrating the operation of the Bluetooth relay device of FIG. 1. Additional advantages are gained by use of a further collision avoidance procedure presented by box 70 drawn with dashed lines. FIG. 6 has the following steps:
61. Start of procedure.
62. Mapping priorities with transmissions occurring at each Bluetooth module BT1 to BT4.
63. Setting for each Bluetooth module a priority equal to the highest priority a transmission that Bluetooth module has going on.
64. Arrange the Bluetooth modules in order of the priorities set (as BTA . . . BTD in FIG. 4).
65. Check if more than one Bluetooth modules share the first place in the order resulting from step 64. If no, then jump to step 67.
66. Pick one Bluetooth module among those sharing the first place and promote it in priority.
67. Select the only one Bluetooth module having the first place as the principal master (BTA). Then return to step 62 for a new round.
70. Further processing (optional feature).

Figure 7:
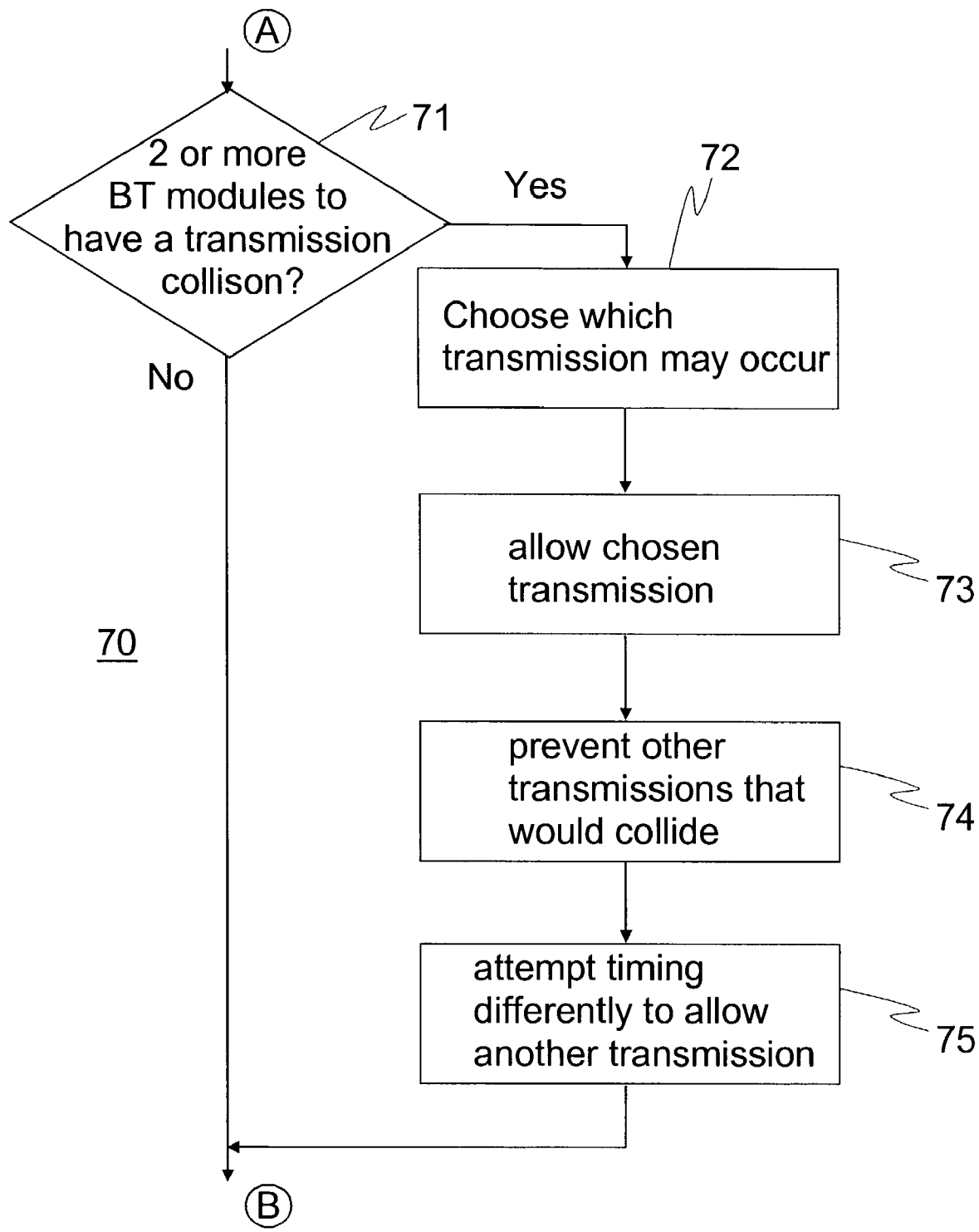
FIG. 7 shows a supplementary procedure to the process of FIG. 6, according to an alternative embodiment.

FIG. 7 shows a supplementary procedure 70 to the process of FIG. 6, according to an alternative embodiment. The procedure starts and ends from points (A) and (B), as marked in FIGS. 6 and 7. The supplementary procedure 70 comprises the steps of:

71. Checking if two or more Bluetooth modules of the relay device would transmit during the same time slot and in the same channel. If yes, then performing the following sub-steps:

72. determining which one of the transmissions should be allowed to occur (for example, by using the priorities or by random selection).

73. allowing the allowed transmission.

74. preventing the other transmissions in the same frequency and on the same time slot.

75. If the other transmissions comprise transmissions that can be sent within various different time slots, performing that transmission in another, allowable time slot.

This alternative embodiment improves the throughput the relay device 10 can reach and reduces errors. Forcing a transmission to wait for another time slot does not seriously deteriorate the service that would use the transmission, because in Bluetooth a time slot is only 625 microseconds long.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

What is claimed is:

1. A communication device comprising:
   a first Low Power Radio Frequency (LPRF) module for transmitting first data in bursts over a first LPRF link; and
   a second LPRF module for transmitting second data in bursts over a second LPRF link; wherein
   the communication device further comprises a processing unit for choosing one of the first and second data and leaving the other data non-chosen; and the processing unit is configured to:
   determine a time window corresponding to the period of transmitting one burst of the chosen data; and
   restrict the transmitting of one burst of the non-chosen data to said time window, for timing the transmitting of two bursts within the same time window.

2. A communication device according to claim 1, wherein the processing unit is further configured to time the transmitting of non-chosen data so that transmitting of one burst of the first data and one burst of the second data end substantially simultaneously.

3. A communication device according to claim 1, wherein the processing unit is further configured to:
   assign a first Quality of Service (QoS) group for the first data;
   assign a second QoS group for the second data; and choose the one of the first and second data based on the QoS group of the first and second data.

4. A communication device according to claim 3, wherein each QoS group is mapped with a predetermined priority so that different QoS groups have different priorities and said choosing the one of the first and second data is performed by choosing the one which has a higher priority.

5. A communication device according to claim 4, wherein the processing unit is configured to repeatedly determine said chosen data and said time window according to the one of first and second data which has a higher priority so that changes in priorities of the first and second data become taken into account.

6. A communication device according to claim 1, wherein the communication device further comprises at least one additional LPRF module for transmitting at least one additional data in bursts over at least one additional LPRF link.

7. A communication device according to claim 3, wherein the communication device further comprises at least one additional LPRF module for transmitting at least one additional data in bursts over at least one additional LPRF link and in that the processing unit is further configured to: assign at least one additional QoS group for the at least one additional data; and choose the one of the first, second and at least one additional data which has a highest priority.

8. A communication device according to claim 1, wherein said communication device is selected from a group consisting of: a mobile communication device and an LPRF relay device.

9. A communication device according to claim 1, wherein the processing unit is further configured to allow only one LPRF module at a time to transmit in one channel.

10. A communication device according to claim 1, wherein said first and second LPRF links are Bluetooth links.

11. A communication system having a first, second and third communication device, said second and third communication devices each comprising a Low Power Radio Frequency (LPRF) module for communicating with the first communication device and the first communication device comprising: a first LPRF module for transmitting first data in bursts over a first LPRF link to the second communication device; and
    a second LPRF module for transmitting second data in bursts over a second LPRF link to the third communication device;
    wherein the communication device further comprises a processing unit for choosing one of the first and second data and leaving the other data non-chosen; and the processing unit is configured to:
    determine a time window corresponding to the period of transmitting one burst of the chosen data; and
    restrict the transmitting of one burst of the non-chosen data to said time window, for timing the transmitting of two bursts within the same time window.

12. A communication system according to claim 11, wherein said first communication device is an LPRF relay device.

13. A communication system according to claim 11, wherein at least one of the second and third communication devices is a mobile communication device.

14. A communication method comprising:
    transmitting first data in bursts from a communication device over a first low-power radio frequency (LPRF) link; and transmitting second data in bursts from the communication device over a second LPRF link;
    wherein the method further comprises:
    choosing one of the first and second data and leaving the other data non-chosen;
    determining a time window corresponding to the period of transmitting one burst of the chosen data; and
    restricting the transmitting of one burst of the non-chosen data to said time window, for timing the transmitting of two bursts within the same time window.

15. A method according to claim 14, wherein the method further comprises timing the transmitting of non-chosen data so that both transmitting of one burst of the first and second data ends substantially simultaneously.

16. A method according to claim 14, wherein the method further comprises:
performing said transmitting first data by a first LPRF module;
performing said transmitting second data by a second LPRF module;
assigning a first Quality of Service (QoS) group for the first data;
assigning a second QoS group for the second data; and
choosing the one of the first and second data which has a higher priority.

17. A method according to claim 14, wherein the method further comprises:
transmitting data by at least one external client to the communication device;
determining an intermediate period of time between two consecutive ones of said time windows; and
restricting the transmitting data by the at least one external client to said intermediate period of time.

18. A computer readable medium for controlling a communication device, comprising:
computer program code for causing the communication device to transmit first data in bursts from a communication device over a first low-power radio frequency (LPRF) link; and
computer program code for causing the communication device to transmit second data in bursts from a communication device over a second LPRF link;
wherein the computer program further comprises:
computer program code for causing the communication device to choose one of the first and second data and leaving the other data non-chosen;
computer program code for causing the communication device to determine a time window corresponding to the period of transmitting one burst of the chosen data; and
computer program code for causing the communication device to restrict the transmitting of one burst of the non-chosen data to said time window, for timing the transmitting of two bursts within the same time window.

* * * * *